United States Patent
Kim

(10) Patent No.: US 8,248,992 B2
(45) Date of Patent: Aug. 21, 2012

(54) METHOD AND APPARATUS FOR PROVIDING HOME NETWORK DEVICE SERVICE TO AN EXTERNAL DEVICE THROUGH WEB SERVICE

(75) Inventor: Che-uk Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 11/546,274

(22) Filed: Oct. 12, 2006

(65) Prior Publication Data

US 2007/0083618 A1    Apr. 12, 2007

(30) Foreign Application Priority Data

Oct. 12, 2005    (KR) .................. 10-2005-0096200

(51) Int. Cl.
*H04W 4/00* (2009.01)
(52) U.S. Cl. .................. 370/328; 709/230
(58) Field of Classification Search .............. 370/328, 370/389; 709/203, 230, 220, 227, 218, 225, 709/228, 222; 726/15; 455/557; 340/3.1; 707/709, 758, 610
See application file for complete search history.

(56) References Cited

U.S. PATENT DOCUMENTS

| | | | |
|---|---|---|---|
| 6,857,009 B1 * | 2/2005 | Ferreria et al. ............. | 709/219 |
| 6,963,925 B1 | 11/2005 | Ishikawa et al. | |
| 2004/0083262 A1 * | 4/2004 | Trantow ..................... | 709/203 |
| 2006/0168264 A1 * | 7/2006 | Baba et al. .................. | 709/230 |
| 2006/0168656 A1 * | 7/2006 | Stirbu ......................... | 726/15 |
| 2008/0225883 A1 | 9/2008 | Tanaka et al. | |

FOREIGN PATENT DOCUMENTS

| | | |
|---|---|---|
| JP | 2001-7861 A | 1/2001 |
| JP | 2001-168888 A | 6/2001 |
| JP | 2003-30071 A | 1/2003 |
| JP | 2003-208366 A | 7/2003 |
| JP | 2003-308264 A | 10/2003 |
| KR | 10-2004-0079472 A | 9/2004 |
| KR | 10-2005-0066066 A | 6/2005 |
| KR | 10-2005-0079479 A | 8/2005 |

OTHER PUBLICATIONS

Nguyen et. al. Archises—middleware architecture for service creation in wireless sensor networks, Aug. 22-24, 2005, Wireless and Mobile Computing, Networking and Communications, 2005. (WiMob'2005), IEEE International Conference on, vol. 4 p. 165-168.*

(Continued)

*Primary Examiner* — Kiet Doan
(74) *Attorney, Agent, or Firm* — Sughrue Mion, PLLC

(57) ABSTRACT

A method and apparatus provide an external device with a local service provided by a home network device in a home network. An OSGi gateway generates a WSDL document by using information about a local service provided by the home network device and distributes the WSDL document to allow the external device to call the local service by using a web service. In response to receiving a SOAP message from the external device, the local service in the home network is called in the home network. A response message to the local service calling is converted into an SOAP message, and the SOAP message is transmitted to the external device. Accordingly, the home network device can provide the home network device service to the external device through the web service without directly installing web service associated functions therein.

17 Claims, 11 Drawing Sheets

OTHER PUBLICATIONS

Lee et. al. Enabling smart spaces with OSGi, Jul.-Sep. 2003, INSPEC vol. 2, Issue 3 p. 89-94.*

Steele. A Web Services-based System for Ad-hoc Mobile Application Integration, Information Technology: Coding and Computing [Computers and Communications], 2003. Proceedings. ITCC 2003. International Conference on Apr. 28-30, 2003 pp. 248-252 and Lee et. al., Enabling Smart Spaces with OSGi, Jul.-Sep. 2003, INSPEC vol. 2, Issue 3 pa.*

Nishiki et. al., Applications and the Internet Workshops, 2005. Saint Workshops 2005. The 2005 Symposium on, Jan. 31-04, 2005 pp. 200-204.*

Nakajima T et al: "Personal home server a software infrastructure for supporting spontaneous and personalized interaction in home computing environments", Consumer Communications and Networking Conference, 2005. CCNC. 2005 Second IEEE Las Vegas, NV, Jan. 3-6, 2005, Piscataway, NJ, pp. 245-250, XP010787644.

Pavlin Dobrev et al: "Device and Service Discovery in Home Networks with OSGi", IEEE Communications Magazine, IEEE Service Center, Piscataway, US, vol. 40, No. 8, Aug. 2002, pp. 86-92, XP011092902.

Charatsis K et al: "Home/Building Automation Environment Architecture Enabling Interoperability, Flexibility and Reusability", Industrial Electronics, 2005., ISIE 2005. Proceedings of the IEEE International Symposium on Dubrovnik, Croatia Jun. 20-23, 2005, Piscataway, NJ, pp. 1441-1446, XP010850305.

Japanese Office Action, dated May 24, 2011, issued in counterpart Japanese application No. 2006-277974.

Notification of Reexamination dated May 16, 2011 from the State Intellectual Property Office of P.R. China in counterpart Chinese application No. 200610131813.X.

Communication, dated Mar. 21, 2012, issued by the Japanese Patent Office in corresponding Japanese Application No. 2006-277974.

Communication, dated Jan. 19, 2012, issued by the State Intellectual Property Office of P.R. China in corresponding Chinese Application No. 200610131813.X.

* cited by examiner

Prior Art

FIG. 10

| API IMPLEMENTING CLASS | API NAME | DESCRIPTION |
|---|---|---|
| WSTranslator | OSGi2WSDL( ) | API GENERATING WSDL FILE CORRESPONDING TO SPECIFICATION OF SERVICE REGISTERED IN OSGi SERVICE REGISTRY |
| | | Parameters |
| | | • String osgiServiceId: IDENTIFIER OF SERVICE REGISTERED IN OSGi SERVICE REGISTRY |
| | | Return Value |
| | | • boolean result: INDICATING WHETHER GENERATING WSDL SUCCEEDED OR NOT |
| | OSGi2WSProviderBundle( ) | API GENERATING WEB SERVICE PROVIDER BUNDLE FOR PROVIDING SERVICE REGISTERED IN OSGi SERVICE REGISTRY IN A FORM OF WEB SERVICE |
| | | Parameters |
| | | • String osgiServiceId: IDENTIFIER OF SERVICE REGISTERED IN OSGi SERVICE REGISTRY |
| | | Return Value |
| | | • boolean result: INDICATING WHETHER GENERATING JAVA CLASS FOR WSProviderBundle SUCCEEDED OR NOT |
| WSListener | listenWSCall( ) | API RECEIVING SOAP MESSAGE WRITTEN IN XML, CONVERTING SOAP MESSAGE INTO JAVA OBJECT, TRANSMITTING JAVA OBJECT TO WEB SERVICE BUNDLE, RECEIVING RESULT OF WEB SERVICE CALLING AS A JAVA OBJECT, AND CONVERTING THE JAVA OBJECT INTO SOAP MESSAGE |
| | | Parameters |
| | | • Node soapEnvelop: SOAP MESSAGE TRANSMITTED FROM A REMOTE SITE FOR WEB SERVICE CALLING |
| | | Return Value |
| | | • Node soapEnvelop: SOAP MESSAGE FOR RESULT OF WEB SERVICE CALLING |
| SOAPProcessor | serializeSOAPResponse( ) | API RECEIVING WEB SERVICE RESULTING VALUE IN A FORM OF JAVA OBJECT AND CONVERTING WEB SERVICE RESULT VALUE INTO SOAP MESSAGE |
| | | Parameters |
| | | • Object result: OBJECT FOR WEB SERVICE RESULTING VALUE<br>• String serviceName: WEB SERVICE NAME<br>• String serviceOperationName: OPERATION NAME IN WEB SERVICE |
| | | Return |
| | | • Node soapResponseBody: SOAP RESPONSE MESSAGE |
| | deserializeSOAPRequest( ) | API ANALYZING SOAP MESSAGE FOR CALLING WEB SERVICE TO CONVERT CALLING PARAMETERS INTO JAVA OBJECT |
| | | Parameters |
| | | • Node soapRequstBody: WEB SERVICE CALLING SOAP MESSAGE<br>• String serviceName: TO-BE-CALLED WEB SERVICE NAME<br>• String serviceOperationName: OPERATION NAME IN TO-BE-CALLED WEB SERVICE |
| | | Return |
| | | • Object[ ] params: WEB SERVICE CALLING PARAMETER JAVA OBJECT |

1
METHOD AND APPARATUS FOR PROVIDING HOME NETWORK DEVICE SERVICE TO AN EXTERNAL DEVICE THROUGH WEB SERVICE

CROSS-REFERENCE TO RELATED PATENT APPLICATION

This application claims the benefit of Korean Patent Application No. 10-2005-0096200, filed on Oct. 12, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to a service provided by a home network device, and more particularly, to allowing an external device to use a local service provided by a home network device in a home network.

2. Description of Related Art

A web service technique allows systems distributed in the web (World-Wide Web) to provide interoperable services independent of platform, programming languages, or the like. The web service can be implemented by using a standard such as XML (extensible markup language), SOAP (simple object access protocol), WSDL (web services description language), and UDDI (universal description, discovery, and integration) standards. FIG. 1 is a conceptual view for explaining a procedure for providing the web service. Referring to FIG. 1, a web service is basically constructed with a service provider, a service client, and a service registry. First, the service provider registers service information in the service registry such as a UDDI registry, and the service client acquires the service information from the service registry. More specifically, the service client acquires an address of a site having a web-service-described document, that is, a WSDL file in which the service is described. After that, the service client downloads the WSDL file for the service. Here, the WSDL document or file is a descriptive specification for service, and the service client uses the WSDL document to acquire information for calling the service. More specifically, the service client which downloads the WSDL file generates a SOAP message for the service call by using the information in the WSDL file. The service client transmits the SOAP message to the service provider to call the service.

This web service technique is used for simple services such as a zip code searching service and a content providing service or for complicated services such as a B2B (business to business) transaction service. Recently, such a web service technique has been used for home network devices. As home network devices such as digital TVs, digital audios, and digital printers are constructed in an intelligent manner in the network, techniques are needed for accessing the home-network-device services provided by the home network devices using the web service so as to control the home network devices and share content.

In this case, a home network device must install a web service engine directly so as to provide its services through the web service. The web service engine denotes a series of software applications for such basic web-service-associated techniques such as XML, SOAP, and WSDL techniques.

FIGS. 2 and 3 are views for explaining conventional procedures for providing a home-network-device service to an external device of a home network. FIG. 2 shows the case where a media server in the home network directly provides a home-network-device service to an external client. In this case, an engine required for providing the web service is directly installed in the home network device. Like this, the home network device that provides the web service must directly provide a WSDL document, that is, a specification of the home network device service to the external device. Therefore, the home network device can process a service call transmitted in the form of a SOAP message. Namely, when the home network device installs the web service engine supporting the XML, SOAP, and WSDL standards, the home network device can provide the web service without requiring the support of other devices.

FIG. 3 shows the case where a home network device providing a home network device service does not have a public IP (Internet Protocol) address. In this case, the home network device having a private IP address provides the home network device service to an external device through a home gateway having a public IP address. The home gateway simply performs an address conversion process and routes a message which was transmitted during service calling and performs return processing between the external device and the home network device. In this case, the home network device must also install the web service engine directly.

Although most of the currently-provided web services employ only the basic standards such as XML, SOAP, and WSDL standards, technical requirements associated with high grade techniques such as securities, service policies, and reliable messaging for the web services must be taken in consideration for the future. In order to satisfy such technical requirements, all the home network devices on the home network must install the web service engines that support the aforementioned high grade techniques. Accordingly, the computing resources or disc resources may be wastefully used because of the need to install the web service engines.

In particular, devices having a relatively small amount of resources cannot install such web service engines directly.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above. An aspect of embodiments of the present invention is to provide an apparatus and method capable of implementing an OSGi bundle that provides a web service function in an OSGi home gateway to allow home network devices to provide home network device services to an external device through a web service without directly installing a web service engine.

According to an aspect of an embodiment of the present invention, there is provided a method of providing a home network device service to an external device, including: (a) acquiring information on a local service provided by at least one network device in a home network; (b) generating a document including information on a web service to allow the external device to call the local service based on the acquired information; (c) distributing the generated document to the external device and receiving a web service calling message generated based on the distributed document; and (d) providing the local service from the home network to the external device in response to the received web service calling message.

In the above aspect, (d) may include: when the web service calling message is received, calling the local service of the network device by using at least one OSGi bundle; receiving the local service by using the OSGi bundle as a result of the local service calling and providing the local service to the external device. In addition, the method may further include: generating a first OSGi bundle which processes the web service calling for the local service in the external device, wherein (d) includes: (d1) in the first OSGi bundle, calling the local service through a second OSGi bundle which controls the local service; (d2) in the first OSGi bundle, receiving a resulting value of the local service calling from the second OSGi bundle; (d3) receiving the resulting value of the local service calling received from the first OSGi bundle; (d4) converting the received resulting value into a response message corresponding to the web service calling message; and (d5) transmitting the converted response message to the external device which transmits the web service calling message.

In addition, (d1) may include: converting the calling message into a JAVA object; transmitting the converted JAVA object to the first OSGi bundle; and in the first OSGi bundle, transmitting the transmitted JAVA object to the second OSGi bundle to allow the second OSGi bundle to call the local service.

According to another aspect of an embodiment of the present invention, there is provided a computer readable recording medium having embodied thereon a computer program that when executed by a computer performs the method described above.

According to another aspect of an embodiment of the present invention, there is provided an apparatus for providing a home network device service to an external device, including: a generation unit which generates a document to allow the external device to call a local service by using information on the local service provided by at least one network device in a home network; a distribution unit which distributes the generated document to the external device; a receiving unit which receives a web service calling message which is generated based on the document from the external device which receives the distributed document; and a web service providing unit which, in response to the received web service calling message, provides the local service from the home network to the external device.

In the above aspect of an embodiment of the present invention, the generation unit may generate a first OSGi bundle which processes the web service calling for the local service in the external device, and the web service providing unit may allow the first OSGi bundle to call the local service through a second OSGi bundle which controls the local service, receive a resulting value of the local service calling from the first OSGi bundle which receives the resulting value of the local service calling from the second OSGi bundle, convert the received resulting value into a response message corresponding to the web service calling message, and transmit the converted response message to the external device which transmits the web service calling message. In addition, the web service providing unit may receive the resulting value in the form of a JAVA object and convert the resulting value into the response message in the form of an SOAP message.

BRIEF DESCRIPTION OF THE DRAWINGS

The above and other features and advantages will become more apparent by describing in detail exemplary embodiments of the present invention thereof with reference to the attached drawings in which like reference numerals refer to the like items, in which:

FIG. 10 is a table for explaining APIs used in a web service driver according to an embodiment of the present invention;

DETAILED DESCRIPTION OF ILLUSTRATIVE, NON-LIMITING EMBODIMENTS OF THE INVENTION

Figure 1:
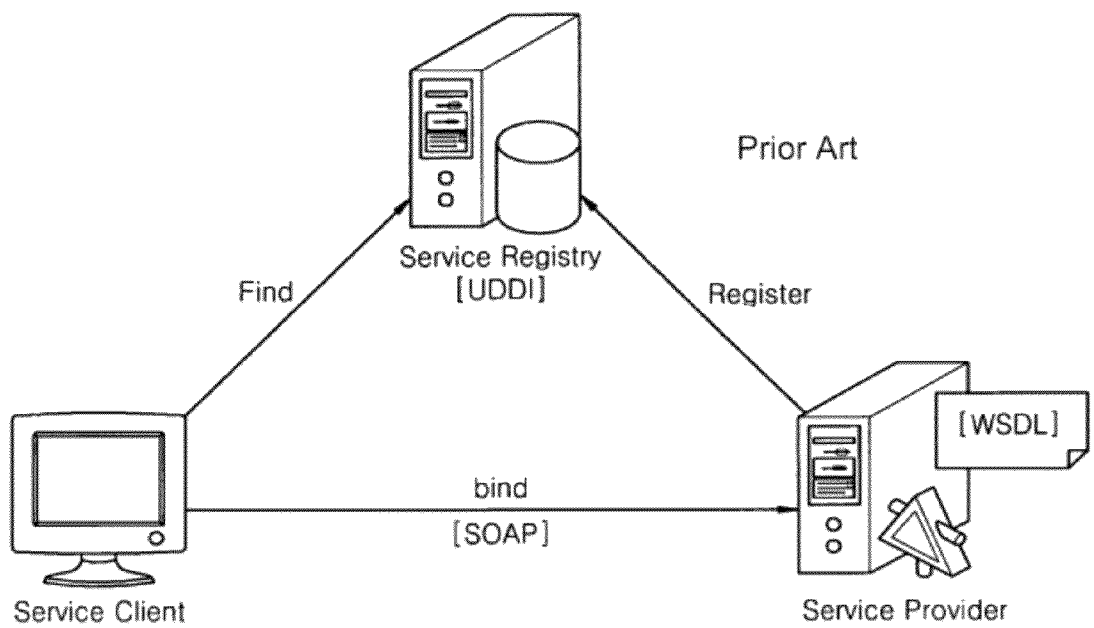
FIG. 1 is a conceptual view for explaining procedures for providing a web service.
Figure 2:
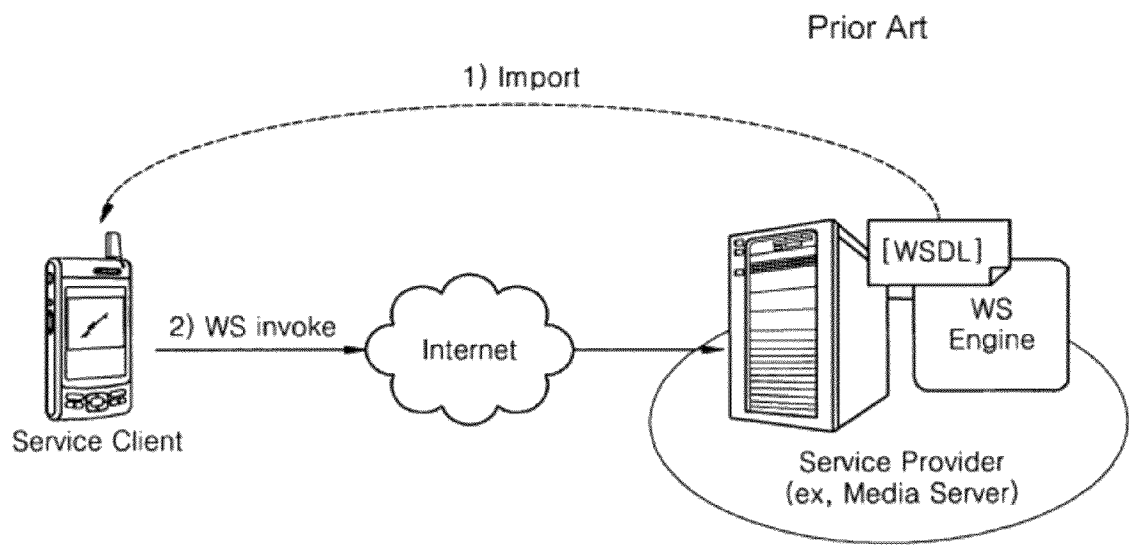
FIG. 2 is a view for explaining conventional procedures where a home network device provides a home network device service to an external device.
Figure 3:
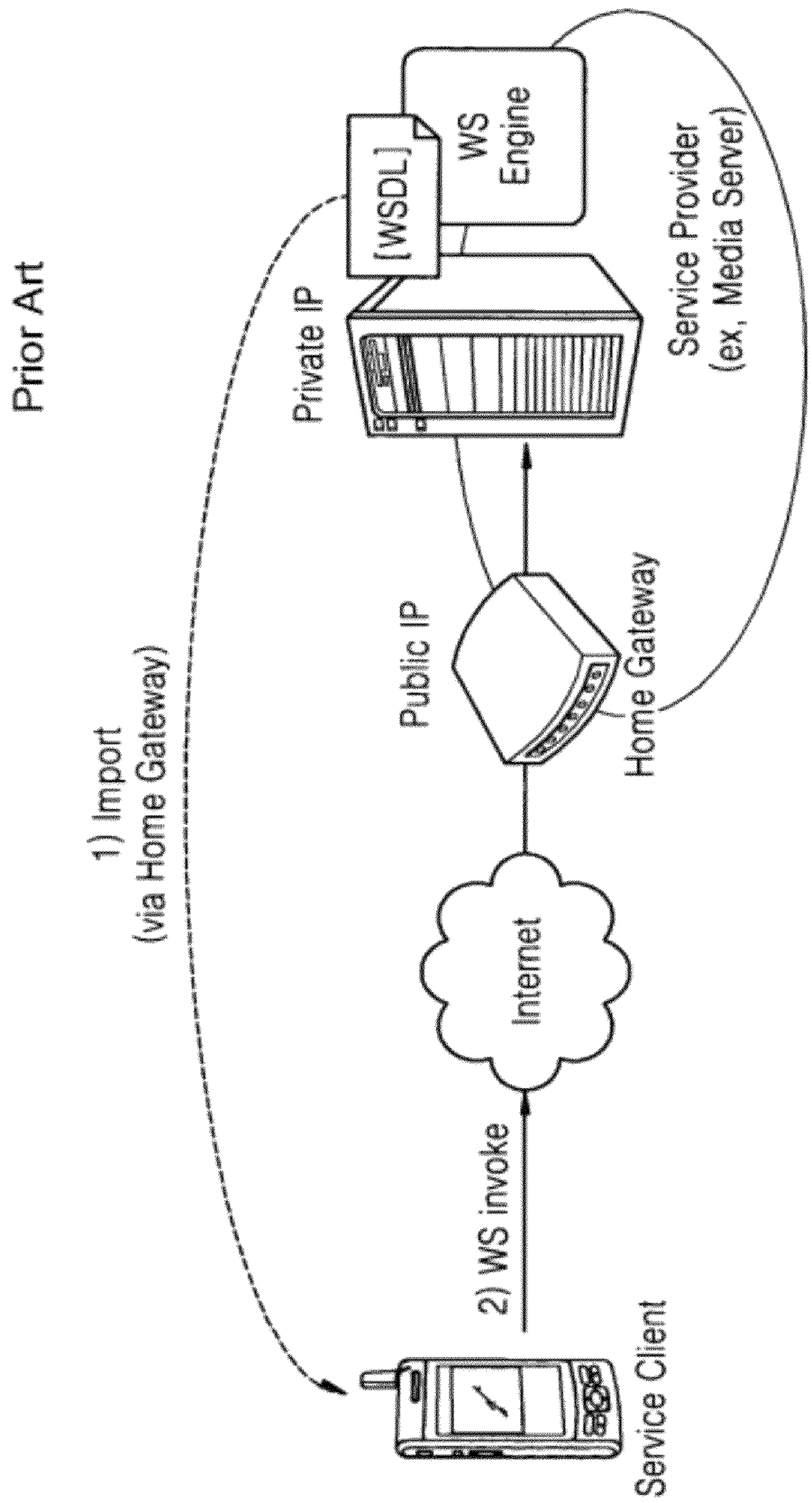
FIG. 3 is a view for explaining conventional procedures where a home network device provides a home network device service to an external device through a home gateway.
Figure 4:
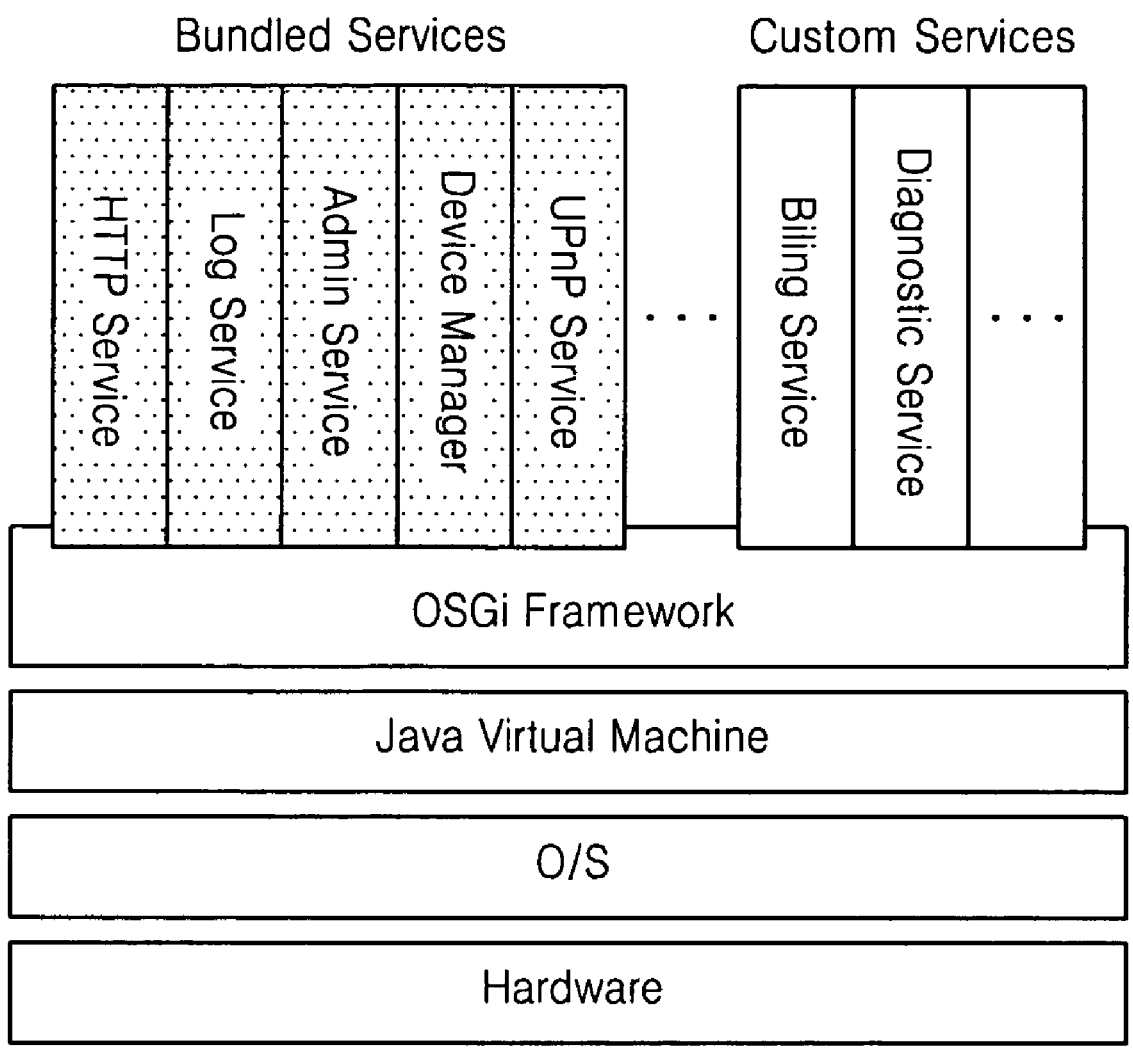
FIG. 4 is a view showing a construction of an OSGi system.

FIG. 4 is a view showing a construction of an OSGi system.

OSGi provides a framework on which a service is performed. An OSGi framework is a standard API specification for a service of a home gateway. As shown in FIG. 4, the OSGi framework operates on a JAVA virtual machine. On the framework, service distribution, service integration, service management, or the like are very flexibly performed. The OSGi provides basic services such as HTTP, service management, and log service on the framework. Service providers distribute their own services in the form of an OSGi bundle over the OSGi framework to provide the services. In particular, OSGi provides general home network techniques such as Universal Plug And Play (UPnP), Jini, and HAVi, so that the OSGi system can secure inter-operability between different types of devices supporting different home network techniques.

Here an OSGi bundle performing functions required for providing a web service is implemented on the OSGi framework, and thus, the home network devices can provide home network device services through the web service. According to the systems described here home network devices can provide the home network device service to an external device through the web service by using only conventional home networking techniques.

Figure 5:
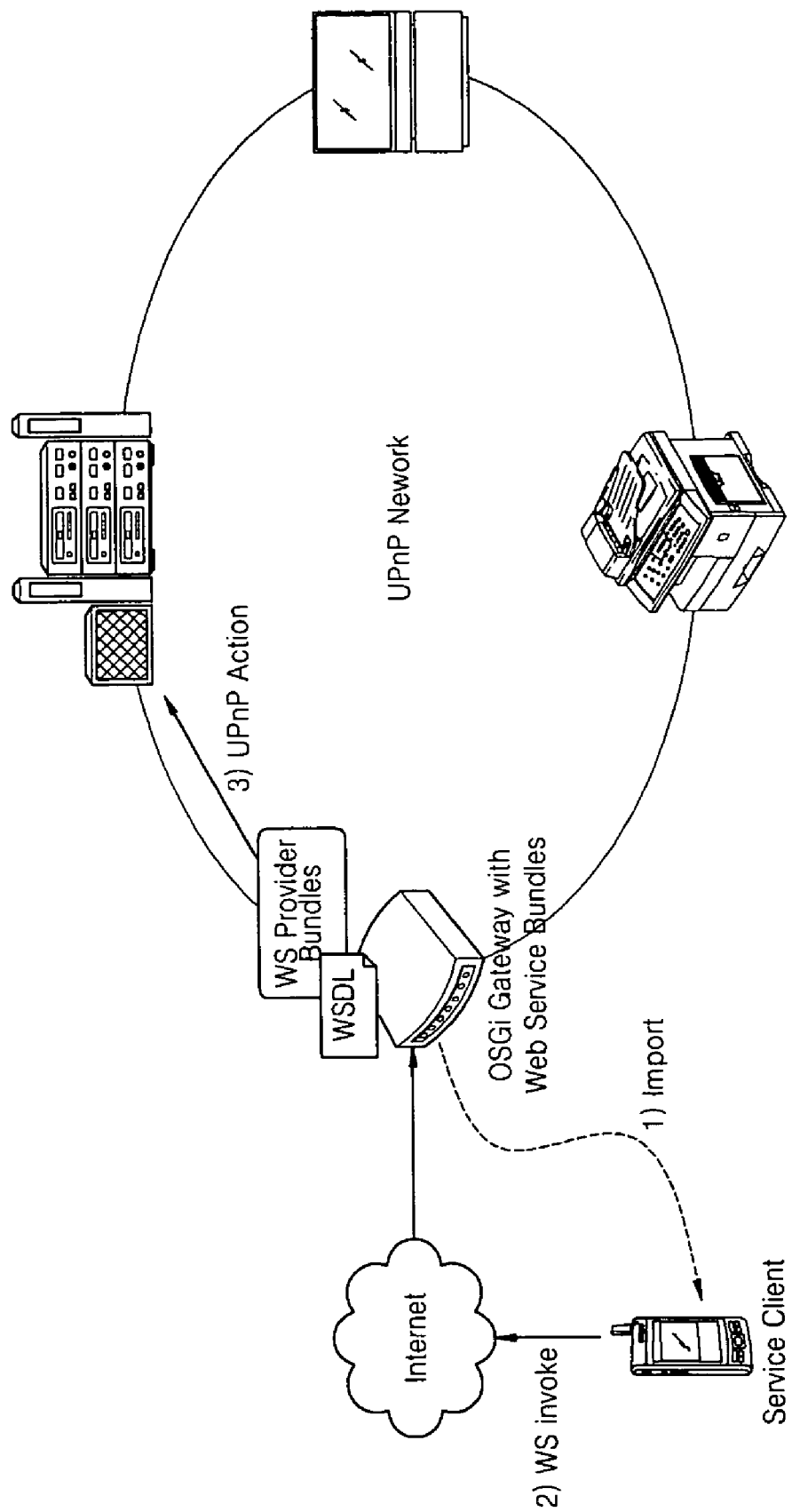
FIG. 5 is a view showing a configuration of a system providing a home network device service to an external device according an embodiment of the present invention.

FIG. 5 is a view showing a configuration of a system providing a home network device service to an external device according an embodiment of the present invention. In the embodiment, it is assumed that the home network operates with the UPnP technique.

As shown in FIG. 5, a web service provider bundle that processes a web service associated function is implemented on the OSGi home gateway, so that the OSGi home gateway performs the web service associated function instead of the home network device. The web service provider bundle implemented on the OSGi home gateway writes a WSDL document based on information on the home network device service. That information is provided by the home network device in the form of a UPnP service and the web service provider bundle on the OSGi home network gateway distributes the WSDL document to an external device. In other words, the web service provider bundle registers the WSDL document in a UDDI (universal description, discovery, and integration) registry. The external client device downloads the WSDL document and performs web service calling with reference to the WSDL document.

The client device performs the web service calling by transmitting a SOAP message. In response to the SOAP message for the web service calling, the OSGi home gateway converts the SOAP message into an UPnP Action to call a local service of the home network device. The OSGi home gateway converts a value resulting from the local service calling into a SOAP message and transmits the SOAP message to the external client device.

Figure 6:
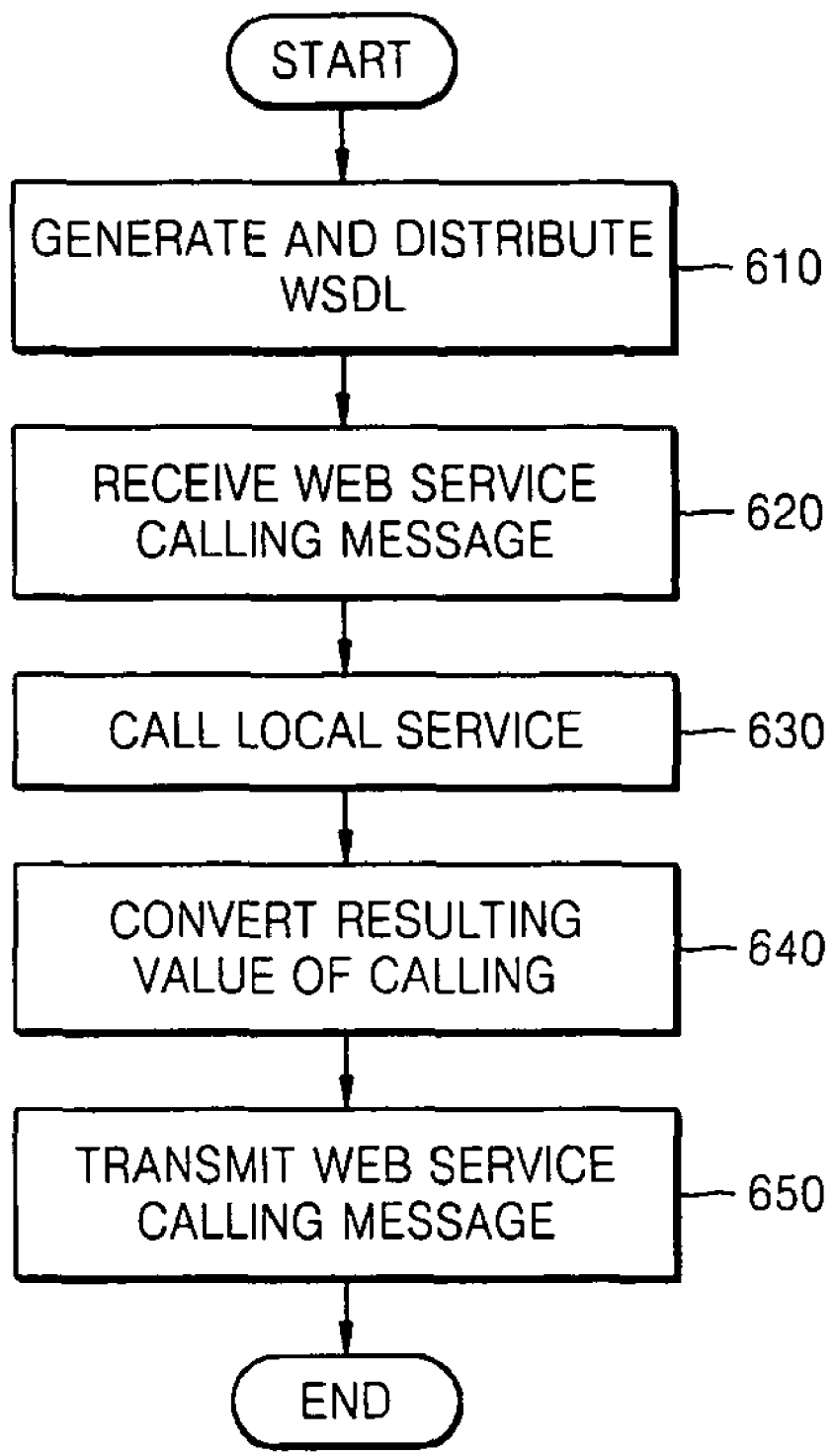
FIG. 6 is a flowchart showing a sequence of procedures for providing a home network device service to an external device according to an embodiment of the present invention.

FIG. 6 is a flowchart showing a sequence of procedures for providing the home network device service to the external device according to an embodiment of the present invention.

According to an embodiment of the present invention, an OSGi home gateway generates a WSDL document including information about a local service of a home network device and distributes the WSDL document to an external client device (610). When a web service calling message transmitted by the external client device downloading the WSDL document is received (620), an associated local service is called (630). A value resulting from the local service calling is converted into an SOAP message (640), and the SOAP message is transmitted to the external client device in response to the web service calling (650).

Figure 7:
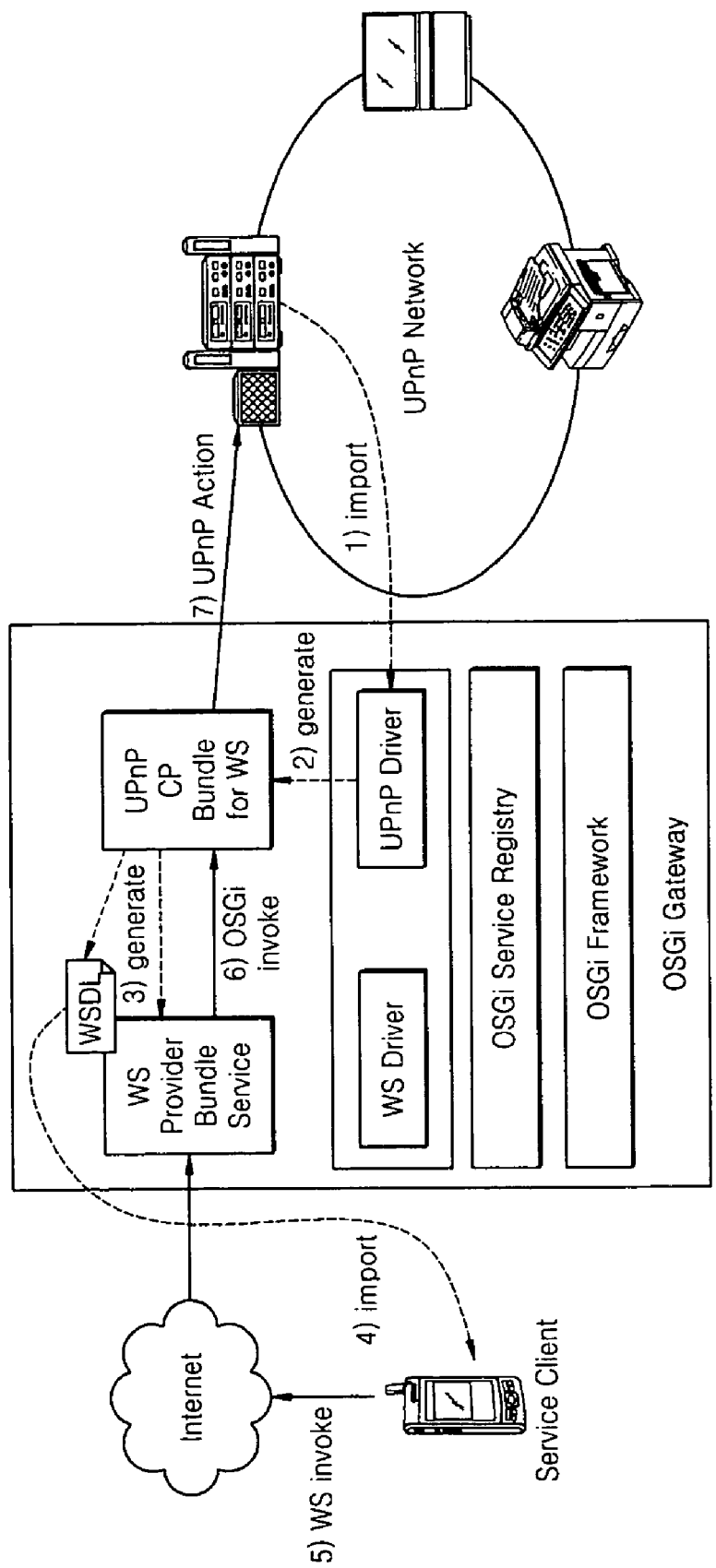
FIG. 7 is a view showing a configuration of a bundle providing a web service through an OSGi gateway according to an embodiment of the present invention.

FIG. 7 is a view showing a configuration of a bundle providing a web service through an OSGi gateway according to an embodiment of the present invention As shown in FIG. 7, a web service driver processing a web service associated function resides on an OSGi framework. The web service driver generates a WSDL document and a web service provider bundle by using a home network device service registered in the OSGi framework and performs an associated SOAP message process.

The home network device that is to provide the home network device service to an external device in the form of a UPnP service registers the home network device service in the form of an OSGi service through the UPnP driver. At this time, the UPnP driver generates a UPNP CP bundle which controls the home network device service, and the service provided by the UPnP CP bundle is registered in the OSGi framework. When the service provided by the UPnP CP bundle is registered, the web service driver generates the web service provider bundle and the WSDL document which serves as a specification of the local service provided by the home network device. Here, an address of the service provided by the web service provider bundle on the OSGi framework is described in the WSDL document, and the external web service client device calls the service of the web service provider bundle with reference to the information described in the WSDL document.

Figure 8:
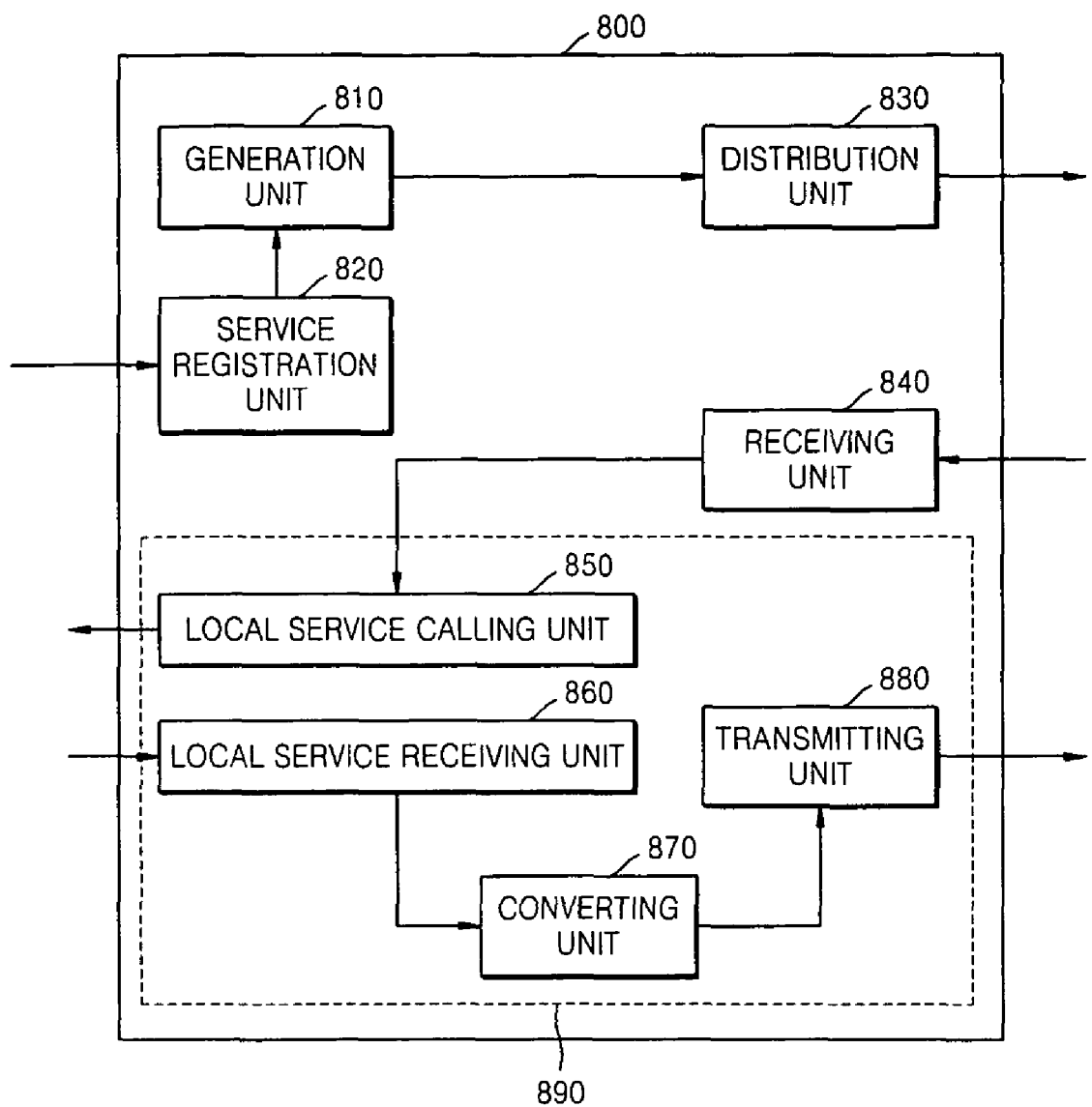
FIG. 8 is a view showing a configuration of an OSGi gateway according to an embodiment of the present invention.

FIG. 8 is a view showing a configuration of an OSGi gateway according to an embodiment of the present invention.

As shown in FIG. 8, the OSGi gateway 800 includes a generation unit 810, a service registration unit 820, a distribution unit 830, a receiving unit 840, and a web service providing unit 890. The web service providing unit 890 includes a local service calling unit 850, a local service receiving unit 860, a converting unit 870, and a transmitting unit 880.

The service registration unit 820 registers the local services provided by home gateway devices as OSGi services. The generation unit 810 generates the WSDL document based on the information on the local services registered in the service registration unit 820. The distribution unit 830 distributes the WSDL document generated by the generation unit 810 to an external device.

The receiving unit 840 receives a SOAP message for web service calling from the external web service client device.

In response to the external web service calling, the web service providing unit 890 calls a local service provided by the home network device and returns a resulting value of the local service calling as a response to the web service calling. More specifically, when the receiving unit 840 receives the SOAP message for the web service calling, the local service calling unit 850 calls the associated local service. Although not shown in the figure, a component for converting the SOAP message into a command for the local service calling may be included. The functions of the component may be performed by the receiving unit 840 or the local service calling unit 850. The local service receiving unit 860 receives from the home network device a value resulting from the calling by the local service calling unit 850. The converting unit 870 converts the resulting value received by the local service receiving unit 860 into a SOAP message. The transmitting unit 880 transmits the SOAP message output from the converting unit 870 to the external client device that calls the web service. These components are implemented with at least one OSGi bundle in the OSGi gateway. Namely, the components may be implemented with individual bundles which perform individual functions. Alternatively, the components may be implemented with a single bundle which performs all the functions. In this case, the components include APIs used to perform the associated functions. A detailed example thereof will be described with reference to FIG. 9.

Figure 9:
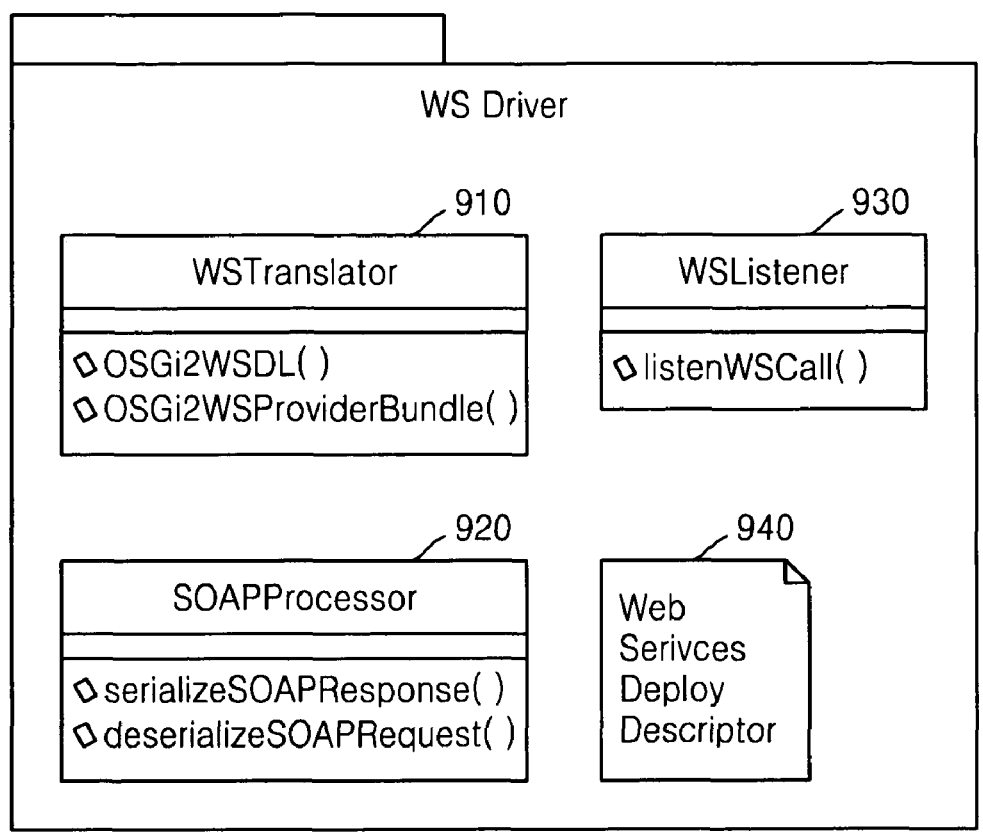
FIG. 9 is a view showing a construction of a web service driver according to an embodiment of the present invention.

FIG. 9 is a view showing a construction of a web service according to an embodiment of the present invention.

As shown in FIG. 9, the web service driver includes three components, namely a WS translator 910, a SOAP processor 920, and a WS listener 930. In addition, the web service driver includes a web service deploy descriptor 940 which provides an WSDL document for the web service disposed on the OSGi framework and associated setting information.

The WS translator 910 generates the WSDL document and the web service provider bundle by using the bundle registered in the OSGi framework. The WS listener 930 receives a SOAP message for the web service call transmitted from an external device and provides a function of processing the SOAP message. The SOAP processor 920 performs the function of analyzing and converting a SOAP message. Examples of APIs using these components are shown in detail in FIG. 10.

Figure 11:
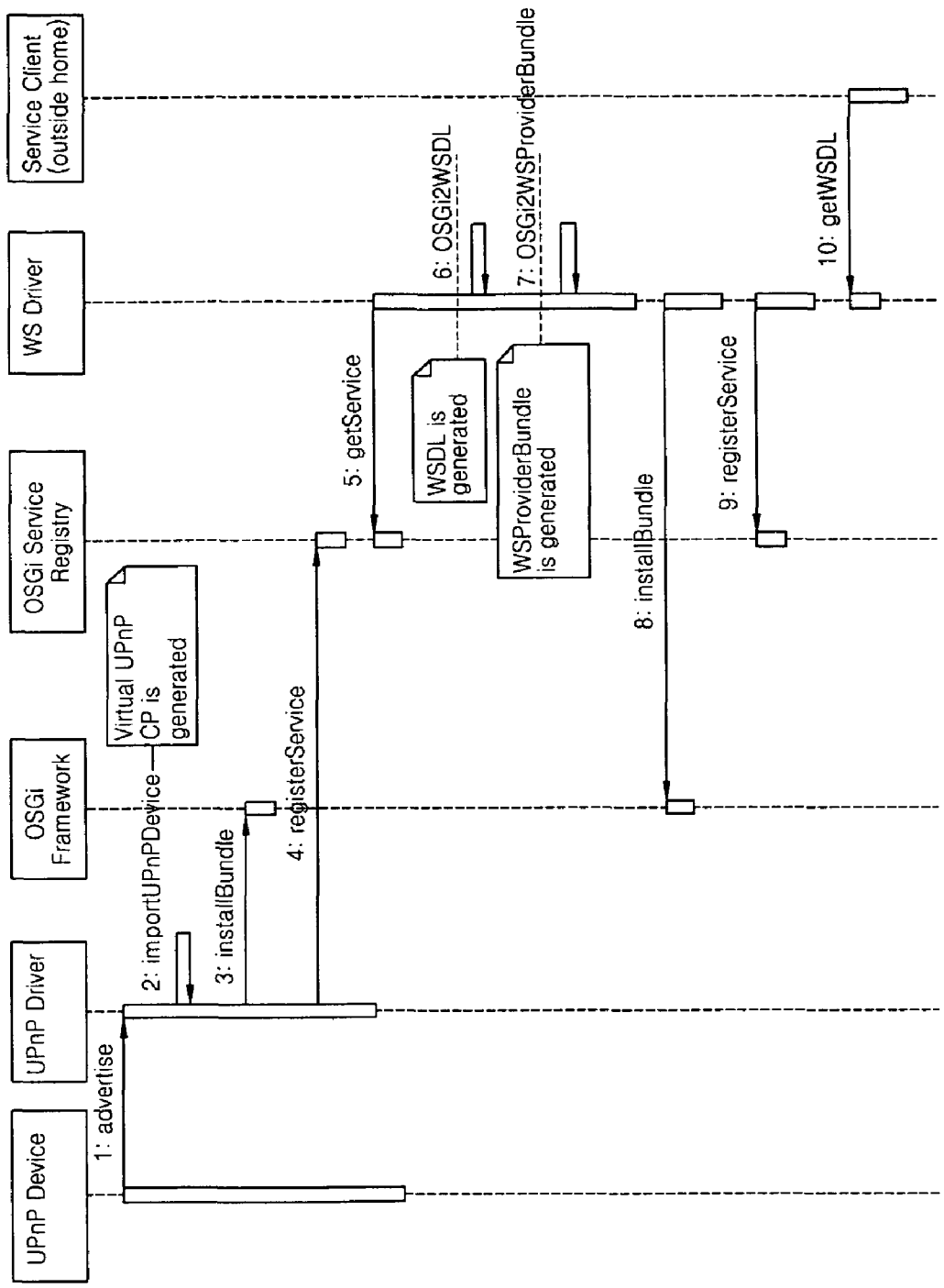
FIG. 11 is a flow diagram for explaining procedures for distributing a WSDL document of a home network device service to external devices according to an embodiment of the present invention.

FIG. 11 is a flow diagram for explaining procedures for distributing a WSDL document of a home network device service to external devices according to an embodiment of the present invention. In the embodiment, it is assumed that a middleware technique for a home network is based on UPnP. The APIs referenced in FIG. 11 correspond to conventional APIs as well as APIs described in FIG. 10.

A home network device (hereinafter, referred to as a UPnP device) which is to provide a home network device service to an external device advertises the home network device service to a UPNP driver (1). Since the UPNP driver basically participates in the UPnP network as a control point, such a scenario is available. The UPNP driver imports the associated service (2) and generates a virtual UPnP CP bundle which is installed to control a service locally imported (3). The service provided by the UPnP CP bundle is registered in an OSGi service registry (4), and the registered service is recognized by the web service driver by sending a get Service message to the OSGi Service Registry (5). The web service driver that recognizes the registered service generates the WSDL document and the associated web service provider bundle based on the information and the associated information (6 and 7). Here, the web service provider bundle is constructed to perform the same operations as those in the service provided by the UPNP device. After the web service driver registers the web service provider bundle (8) and the service associated with the web service provider bundle (9), the external web service client device downloads the WSDL file (10). As a result, the procedures for exporting the local service provided by the home network device to the external device are completed.

Figure 12:
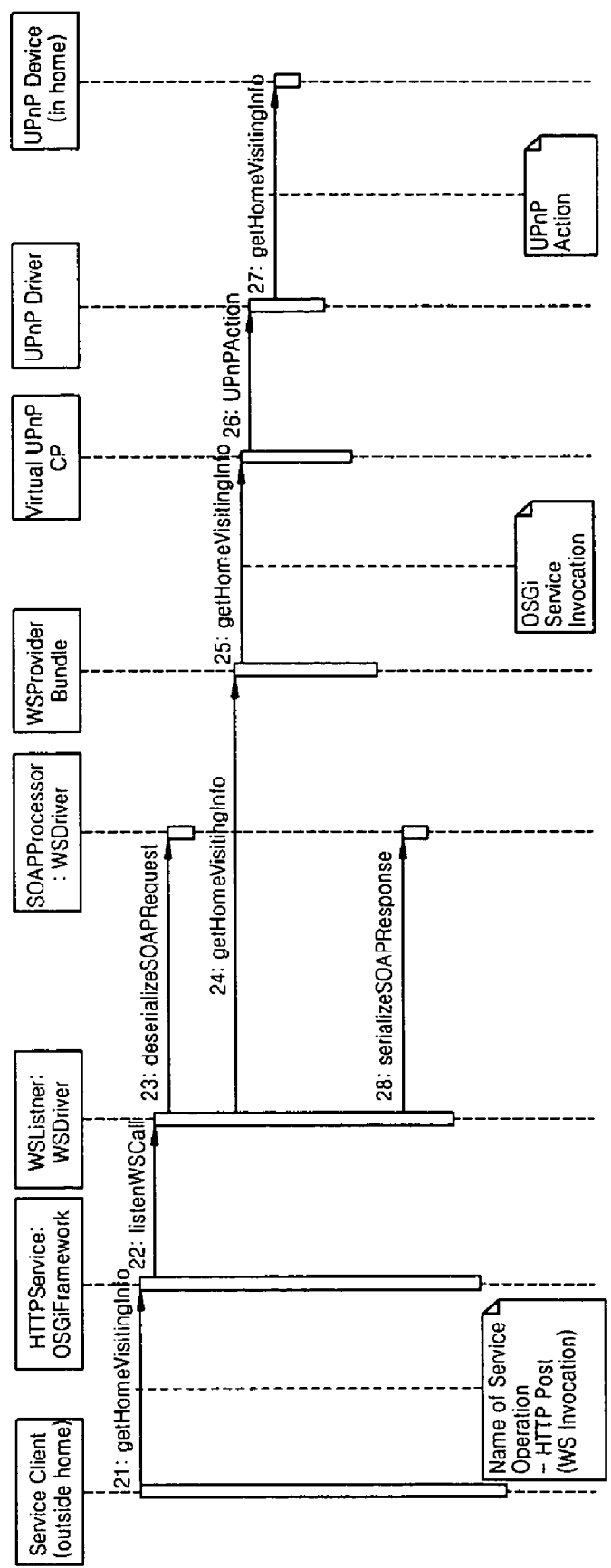
FIG. 12 is a flow diagram for explaining procedures where an external device uses a home network device service through a web service according to an embodiment of the present invention.

FIG. 12 is a flow diagram for explaining procedures where an external device uses a home network device service through a web service according to an embodiment of the present invention. The APIs referenced in FIG. 12 refer to conventional APIs and APIs described in FIG. 10.

After the external web service client device generates a SOAP message by using the information in the downloaded WSDL file, the external web service client device transmits the SOAP message to an address included in the WSDL files so as to call a service associated with the WSDL file (21). The WS listener of the web service driver receives the SOAP message through the HTTP service (22) and converts the SOAP message into an JAVA object by using the SOAP processor (23). After that, the WS listener transmits the JAVA object to the web service provider bundle (24). When the web service provider bundle calls a virtual UPNP CP in an OSGi calling manner (25), the virtual UPNP CP internally converts the associated service calling into an UPnP Action by using the UPNP driver and calls the service of the UPnP device in the home network (26 and 27). After that, the WS listener that receives a result of the service in the form of a JAVA object converts the result of the service into an SOAP message by using the SOAP processor and transmits the SOAP message to the external web service client device (28).

The embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

According to the present invention, web service associated functions are implemented in an OSGi home gateway, so that home network devices can provide home network device services to external devices through a web service without directly installing web service engines therein. In addition, even in the case where components satisfying technical requirements such as securities, transaction process, reliable messages, and service policies must be added to the web service engines, the OSGi home gateway can sufficiently satisfy the technical requirements, so that it is possible to reduce computing resources and disc resources of the home network devices.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of providing a home network device service to an external device, comprising:
   (a) acquiring information about a local service provided by at least one network device in a home network;
   (b) generating a document based on the acquired information, the document including information about a web service to allow the external device, which is outside of the home network, to call the local service;
   (c) distributing the generated document to the external device and receiving a web service calling message generated based on the distributed document; and
   (d) providing the local service from the home network to the external device in response to receiving the web service calling message,
   wherein the document generated in (b) is a WSDL (web service description language) document, and
   in (c), the WSDL document is distributed by registering the WSDL document in a UDDI (universal description, discovery, and integration) registry.

2. The method of claim 1, wherein the home network is a universal plug and play (UPnP) network, and in (a), the information about the local service is acquired based on an UPnP advertisement message.

3. The method of claim 1, wherein (d) comprises:
   in response to receiving the web service calling message, at least one OSGi bundle calls the local service of the network device;
   using the OSGi bundle to receive the local service as a result of the local service calling and providing the local service to the external device.

4. The method of claim 3, further comprising generating a first OSGi bundle which processes the web service calling message for the local service, wherein (d) comprises:
   (d1) in the first OSGi bundle, calling the local service through a second OSGi bundle which controls the local service;
   (d2) in the first OSGi bundle, receiving from the second OSGi bundle, a value resulting from the local service calling;
   (d3) receiving the local service calling result value received from the first OSGi bundle;
   (d4) converting the received local service calling result value into a response message corresponding to the web service calling message; and
   (d5) transmitting the converted response message to the external device.

5. The method of claim 4, wherein the web service calling message and the response message are SOAP (simple object access protocol) messages.

6. The method of claim 5, wherein (d1) comprises:
   converting the calling message into a JAVA object;
   transmitting the converted JAVA object to the first OSGi bundle; and in the first OSGi bundle, transmitting the transmitted JAVA object to the second OSGi bundle to allow the second OSGi bundle to call the local service.

7. The method of claim 6, wherein in (d4) the JAVA object is converted to the SOAP message.

8. A computer readable recording medium having embodied thereon a computer program that when executed by a computer performs the method recited in claim 1.

9. The method according to claim 1, wherein the web service calling message is received from the external device.

10. The method according to claim 1, wherein the web service allows systems distributed in the web to provide interoperable services.

11. An apparatus for providing a home network device service to an external device, comprising:
- a generation unit which generates a document to allow the external device to call a local service by using information about the local service provided by at least one network device in a home network;
- a distribution unit which distributes the generated document to the external device;
- a receiving unit which receives a web service calling message from the external device wherein the web service calling message is generated based on the document distributed to the external device; and
- a web service providing unit which, in response to the receiving unit receiving the web service calling message, provides the local service from the home network to the external device; and
- wherein the external device is outside of the home network,
- wherein the document is a WSDL (web service description language) document, and
- wherein the distribution unit registers the WSDL document in a UDDI (universal description, discovery, and integration) registry.

12. The apparatus of claim 11, wherein the generation unit acquires the information about the local service based on a universal plug and play (UPnP) advertisement message, and the home network is a UPnP network.

13. The apparatus of claim 11, wherein, in response to the receiving unit receiving the web service calling message, the web service providing unit calls the local service of the network device by using at least one OSGi bundle, as a result of the local calling receives the local service by using the OSGi bundle, and provides the local service to the external device.

14. The apparatus of claim 13,
wherein the generation unit generates a first OSGi bundle which processes the web service calling for the local service for the external device, and
wherein the web service providing unit allows the first OSGi bundle to call the local service through a second OSGi bundle which controls the local service, receives a resulting value of the local service calling from the first OSGi bundle which receives the resulting value of the local service calling from the second OSGi bundle, converts the received resulting value into a response message corresponding to the web service calling message, and transmits the converted response message to the external device.

15. The apparatus of claim 14, wherein the web service calling message and the response message are SOAP (simple object access protocol) messages.

16. The apparatus of claim 15, wherein the web service providing unit converts the web service calling message into a JAVA object and transmits the converted JAVA object to the first OSGi bundle to allow the first OSGi bundle to call the local service through the second OSGi bundle which controls the local service by using the JAVA object.

17. The apparatus of claim 16, wherein the web service providing unit receives the resulting value in the form of a JAVA object and converts the resulting value into the response message in the form of a SOAP message.

* * * * *